(12) United States Patent
Noh et al.

(10) Patent No.: US 9,839,880 B2
(45) Date of Patent: Dec. 12, 2017

(54) HOLLOW FIBER MEMBRANE MODULE AND WATER TREATMENT DEVICE USING HOLLOW FIBER MEMBRANE MODULE

(71) Applicant: UNIVERSITY INDUSTRY FOUNDATION YONSEI UNIVERSITY WONJU CAMPUS, Wonju (KR)

(72) Inventors: Soo Hong Noh, Seoul (KR); Jong Hun Lee, Goyang (KR); Danhong Kim, Seoul (KR); Jong chan Yi, Wonju (KR)

(73) Assignee: UNIVERSITY INDUSTRY FOUNDATION YONSEI UNIVERSITY WONJU CAMPUS, Wonju-si (KR)

( * ) Notice: Subject to any disclaimer, the term of this patent is extended or adjusted under 35 U.S.C. 154(b) by 134 days.

(21) Appl. No.: 14/769,849

(22) PCT Filed: Feb. 21, 2014

(86) PCT No.: PCT/KR2014/001405
§ 371 (c)(1),
(2) Date: Aug. 24, 2015

(87) PCT Pub. No.: WO2014/129835
PCT Pub. Date: Aug. 28, 2014

(65) Prior Publication Data
US 2016/0016120 A1    Jan. 21, 2016

(30) Foreign Application Priority Data
Feb. 25, 2013 (KR) .................... 10-2013-0020037
Feb. 12, 2014 (KR) .................... 10-2014-0016212

(51) Int. Cl.
*B01D 63/00* (2006.01)
*C02F 9/00* (2006.01)
(Continued)

(52) U.S. Cl.
CPC .......... *B01D 63/02* (2013.01); *B01D 63/024* (2013.01); *B01D 63/04* (2013.01); *B01D 65/02* (2013.01);
(Continued)

(58) Field of Classification Search
CPC .......... B01D 2315/06; B01D 2321/185; B01D 65/08; B01D 61/18; B01D 63/02; B01D 63/024; B01D 63/04; B01D 2317/04
See application file for complete search history.

(56) References Cited

U.S. PATENT DOCUMENTS 3,612,282 A * 10/1971 Cheng .................... B01D 61/08
                                                                        210/321.89
3,702,656 A * 11/1972 Gutterman et al. ...... B03B 5/28
                                                                        209/156
(Continued)

FOREIGN PATENT DOCUMENTS

CN       1344582      4/2002
CN       202129029    2/2012
(Continued)

OTHER PUBLICATIONS

Office Action, SIPO, dated May 5, 2016, Chinese Patent Application No. 201480010336.4.
(Continued)

*Primary Examiner* — Ana Fortuna
(74) *Attorney, Agent, or Firm* — Lex IP Meister, PLLC

(57) ABSTRACT

A water treatment device using a hollow fiber membrane module is provided, including: a water container filled with raw water; a hollow fiber membrane module installed in the water container and provided with hollow fiber membranes therein to perform water treatment by a water pressure difference; and a raw water supplying part positioned on the water container, and configured to supply the raw water into
(Continued)

the water container through the hollow fiber membrane module, in which the hollow fiber membrane module causes the raw water supplied from the raw water supplying part collide with the hollow fiber membrane to move the hollow fiber membrane, so that it is possible to minimize contamination of the hollow fiber membrane, minimize use of energy using electricity, and wash the hollow fiber membrane by a physical method.

18 Claims, 15 Drawing Sheets

(51) Int. Cl.
  *C02F 1/44* (2006.01)
  *B01D 63/02* (2006.01)
  *B01D 65/02* (2006.01)
  *B01D 65/08* (2006.01)
  *B01D 63/04* (2006.01)

(52) U.S. Cl.
  CPC .............. *B01D 65/08* (2013.01); *C02F 1/44* (2013.01); *B01D 2311/20* (2013.01); *B01D 2313/04* (2013.01); *B01D 2313/105* (2013.01); *B01D 2313/13* (2013.01); *B01D 2313/19* (2013.01); *B01D 2313/21* (2013.01); *B01D 2313/50* (2013.01); *B01D 2317/02* (2013.01); *B01D 2319/04* (2013.01); *B01D 2321/2033* (2013.01); *B01D 2321/2041* (2013.01); *B01D 2321/2058* (2013.01)

(56) References Cited

U.S. PATENT DOCUMENTS

| | | | |
|---|---|---|---|
| 4,002,567 A | 1/1977 | Konno et al. | |
| 4,547,289 A * | 10/1985 | Okano | B01D 63/024 210/321.89 |
| 4,828,882 A * | 5/1989 | Tsezos | B01J 2/006 427/213 |
| 5,248,424 A * | 9/1993 | Cote | B01D 61/142 210/321.69 |
| 6,375,848 B1 * | 4/2002 | Cote | B01D 61/142 210/321.78 |
| 6,524,481 B2 * | 2/2003 | Zha | B01D 63/02 210/321.69 |
| 7,267,769 B2 * | 9/2007 | Baird | B01D 61/025 210/232 |
| 7,491,329 B2 * | 2/2009 | Takeda | B01D 63/02 210/257.2 |
| 7,635,428 B2 * | 12/2009 | Marui | B01D 63/02 210/321.72 |
| 8,852,439 B2 * | 10/2014 | Frauchiger | A47G 21/188 210/257.2 |
| 2001/0047962 A1 * | 12/2001 | Zha | B01D 63/02 210/636 |
| 2002/0011438 A1 | 1/2002 | Jimbo | |
| 2002/0070157 A1 * | 6/2002 | Yamada | B01D 61/18 210/321.8 |
| 2003/0075504 A1 * | 4/2003 | Zha | B01D 63/02 210/636 |
| 2004/0035779 A1 * | 2/2004 | Vossenkaul | B01D 63/024 210/321.6 |
| 2004/0245174 A1 * | 12/2004 | Takayama | B01D 61/18 210/636 |
| 2005/0077227 A1 * | 4/2005 | Kirker | B01D 63/02 210/321.69 |
| 2005/0115899 A1 * | 6/2005 | Liu | B01D 63/024 210/636 |
| 2006/0118487 A1 * | 6/2006 | Adams | B01D 61/22 210/636 |
| 2015/0136697 A1 * | 5/2015 | Sakurai | C02F 1/444 210/650 |

FOREIGN PATENT DOCUMENTS

| | | |
|---|---|---|
| JP | 0699042 | 4/1994 |
| JP | 07-136469 | 5/1995 |
| JP | 11-207157 | 8/1999 |
| JP | 2000-153101 | 6/2000 |
| KR | 10-2002-0014742 | 2/2002 |
| KR | 10-2004-0002814 | 1/2004 |
| KR | 10-2006-0021552 | 3/2006 |
| KR | 10-2012-0122928 | 11/2012 |
| WO | 2011/099656 | 8/2011 |

OTHER PUBLICATIONS

Peter-Varbanets, M., Hammes, F., Vital., M., Pronk, W., "Stabilization of flux during dead-end ultra-low pressure ultrafiltration", Jun. 2010, Water Research, 44, 3607-3616.

Peter-Varbanets, M., Johnston, R., Meierhofer, R., Kage, F., Pronk, W., "Gravity-driven membrane disinfection for household drinking water treatment", Jul. 2011 35th WEDC International Conference, Loughborough, UK, The future of water, sanitation and hygiene: innovation, adaptation and engagement in a changing world.

Cholera annual report 2010. Weekly Epidemiological Record, vol. 81, No. 31, Jul. 2011, pp. 325-340.

* cited by examiner

HOLLOW FIBER MEMBRANE MODULE AND WATER TREATMENT DEVICE USING HOLLOW FIBER MEMBRANE MODULE

CROSS-REFERENCE TO RELATED APPLICATION

This application claims priority to and the benefit of Korean Patent Application No. 10-2013-0020037 and 10-2014-0016212 filed in the Korean Intellectual Property Office on Feb. 25, 2013 and Feb. 12, 2014, the entire contents of which are incorporated herein by reference.

BACKGROUND OF THE INVENTION (a) Field of the Invention

The present invention relates to a water treatment device using a hollow fiber membrane module. More particularly, the present invention relates to a hollow fiber membrane, of which membrane washing is easy, and a water treatment device using the same.

(b) Description of the Related Art

In general, an isolation membrane technology is one of isolation technologies using a material selective transmissive property of a polymer material, and an isolation membrane is divided into a flat sheet membrane, a tubular type membrane, and a hollow fiber membrane according to a form thereof.

A membrane filtration process using the isolation membrane occupies a smaller site area than that of an existing water treatment process, and is capable of completely removing a material having a larger normal pore size than that of the membrane, so that the membrane filtration process is use for a water treatment facility requiring safety. Further, the isolation membrane technology may be formed as a small module, so that the isolation membrane technology is applicable to small-scale water treatment.

An isolation membrane is modularized so as to be convenient to use and selected according to a usage. Among the isolation membranes, the hollow fiber membrane uses a hollow fiber having a diameter of 0.2 to 2 mm and an empty center. The hollow fiber membrane has a larger membrane area ratio per unit volume than that of another type of isolation membrane. Accordingly, the hollow fiber membrane has high productivity. Further, the hollow fiber membrane has a small diameter, so that the hollow fiber membrane may maintain a form by itself, and does not require a separate support, thereby being widely used.

However, the isolation membrane module requires a large pressure difference so there is a problem in that contamination of the isolation membrane is accelerated, and a pump and a blower requiring high energy consumption are required in order to decrease membrane contamination due to a suspended solid. As described above, the water treatment device using the isolation membrane module in the related art has a structure requiring high energy consumption and a high cost, and consequently, a region having insufficient electricity or an underdeveloped nation has difficulty in repairing and maintaining the water treatment device, and thus it is not easy to use the water treatment device.

In order to solve the problem, a non-power water treatment technology filtering water by using a water head pressure of a water container has been developed. However, the structure cannot properly wash contaminants attached to the membrane module. Accordingly, the amount of water produced is continuously decreased during the maintenance of the filtration.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a hollow fiber membrane module, which may be used for a long time without washing by minimizing contamination of the hollow fiber membrane, and a water treatment device using the hollow fiber membrane module.

The present invention has also been made in an effort to provide a hollow fiber membrane module which may minimally use energy using electricity, and of which a hollow fiber membrane is washable by a physical method, and a water treatment device using the hollow fiber membrane module.

The present invention has also been made in an effort to provide a hollow fiber membrane module which may maximize efficiency of removal of contaminants, such as scale generated during a water treatment using a hollow fiber membrane, and a water treatment device using the hollow fiber membrane module.

The present invention has also been made in an effort to provide a hollow fiber membrane module of which an equipment configuration may be simplified and maintenance cost may be minimized, and a water treatment device using the hollow fiber membrane module.

An exemplary embodiment of the present invention provides a water treatment device, including: one or more water containers filled with raw water; one or more hollow fiber membranes installed in the water container and provided with hollow fiber membranes therein to perform water treatment by a water pressure difference; and a raw water supplying part positioned on the water container and configured to supply the raw water into the water container through the hollow fiber membrane module by using potential energy formed by a height difference, in which the hollow fiber membrane module causes the raw water supplied from the raw water supplying part to collide with the hollow fiber membrane to move the hollow fiber membrane.

The raw water supplying part may include: one or more raw water containers positioned on the water container and configured to accommodate raw water to be supplied to the water container; and a raw water pipe configured to connect a bottom of the raw water container with the hollow fiber membrane module to allow the raw water to move.

The raw water container may be detachably/attachably installed at an upper end of the water container.

The raw water container may configure a cover laid on an upper end of the water container, of which the upper end is opened, to cover the water container, a support extended in a downward direction may be installed on a lateral surface of the raw water container, and a guide holder, which is installed at a position corresponding to the support formed position and has opened upper end and lower end, and through which the support passes, and a supporting holder, which is installed next to the guide holder and has an opened upper end and a closed lower end, and into which the support is fitted to be supported, may be installed on an upper portion of a lateral surface of the water container, so that the raw water container is disposed while being spaced apart from the upper end of the water container.

The raw water pipe may be formed of a hose made of a flexible material.

An isolation plate, which isolates an internal space of the water container into an upper space and a lower space, may be installed at an internal side of the upper portion of the water container, so that the upper portion of the water container may configure a raw water container, a movement passage formed by a partition wall, which is communicated with the raw water container and extended toward a bottom side of the water container inside the water container, may configure a raw water pipe through which raw water moves, and the hollow fiber membrane may be mounted on the partition wall to receive the raw water through the movement passage.

The isolation plate or a bottom of the raw water container may have a structure inclined in an upward direction or a downward direction toward the partition wall or the raw water pipe.

The water container may be formed of a container.

In the water container, the plurality of hollow fiber membrane modules may be arranged and installed on the partition wall at intervals, and a treated water pipe installed in each hollow fiber membrane module to discharge treated water may be connected with a common discharge line to discharge treated water to the outside.

In the present exemplary embodiment, the hollow fiber membrane module may have a structure in which raw water supplied to the water container collides with the hollow fiber membrane to shake and wash the hollow fiber membrane.

Another exemplary embodiment of the present invention provides a hollow fiber membrane module including: a header coupled with a water container in which raw water is accommodated; a hollow fiber membrane of which one end is coupled with an internal side of the header and the other end configures a free end, and which filters raw water by water head; and a housing installed in the header, extended into the water container, and including the hollow fiber membrane disposed therein, in which the header causes raw water injected into the water container to collide with the hollow fiber membrane within the housing to shake and wash the hollow fiber membrane, and fills the raw water inside the water container.

The hollow fiber membrane module may further include: a collector installed in the header and connected with the hollow fiber membrane to collect treated water; a treated water pipe connected with the collector to discharge the treated water; a supply pipe installed in the header to supply the raw water; an injection pipe connected with the supply pipe and extended into the housing to discharge the raw water; and a raw water distributing part installed at a front end of the injection pipe to make the raw water discharged through the injection pipe collide with the hollow fiber membrane.

The header may further include a fastening part for coupling with the water container.

The fastening part may have a structure in which a male thread is formed on an external peripheral surface of the header and a fastener provided with a female thread on an internal peripheral surface thereof is formed in the water container, so that the fastening part is screw-engaged with the fastener and detachably/attachably coupled to the fastener.

The fastening part may be installed in the header and have a structure in which a female thread is formed on an internal peripheral surface of the fastening part, and a fastener formed with a male thread on an external peripheral surface thereof may be formed in the water container, so that the fastening part may be screw-engaged and detachably/attachably coupled with the fastener.

The fastening part may be formed with a flange protruding to the outside of the header, and a plurality of fastening holes may be formed in the flange at intervals to be bolt-coupled with the water container.

The fastening part may further include a sealing member for maintaining air-tightness with the water container.

The fastening part may include a flange which protrudes from a front end of the fastening part and is formed with a plurality of fastening holes.

The header may be formed in a polygonal shape.

The header may be formed in a circular shape.

Protrusions may protrude from an external peripheral surface of the header.

The injection pipe may be installed at a center of the header and disposed at a center of the housing, and the hollow fiber membrane may be disposed between the injection pipe and an internal peripheral surface of the housing based on the injection pipe.

The hollow fiber membrane may have a structure in which one end of the hollow fiber membrane is coupled with the collector and the other end thereof configures a free end.

The raw water distributing part may include: a blocking member installed at the front end of the injection pipe to block a flow of the raw water; and a plurality of outlets formed on an external peripheral surface of the front end of the injection pipe toward the hollow fiber membrane to discharge the raw water to the hollow fiber membrane.

The blocking member may have a structure in which a hole discharging raw water is formed at a center of the blocking member.

The blocking member may be formed in a conic shape protruding to the outside.

The raw water distributing part may further include a conic-shaped inducing member which is installed at an internal side of the blocking member and has a gradually decreasing diameter toward the injection pipe.

As described above, according to the water treatment device, it is possible to use a hollow fiber membrane over a long time without washing by minimizing contamination of the hollow fiber membrane by using inflow energy of raw water.

Further, it is possible to wash a membrane while minimizing the use of electricity.

Further, it is easy to operate the water treatment device and it is simple to maintain and repair the water treatment device, and it is possible to operate and maintain the water treatment device without professional manpower or an infrastructure.

Accordingly, it is possible to safely provide water by applying the water treatment device to a remote area or a disaster area in which it is difficult to supply electricity.

DETAILED DESCRIPTION OF THE EMBODIMENTS

Figure 1:
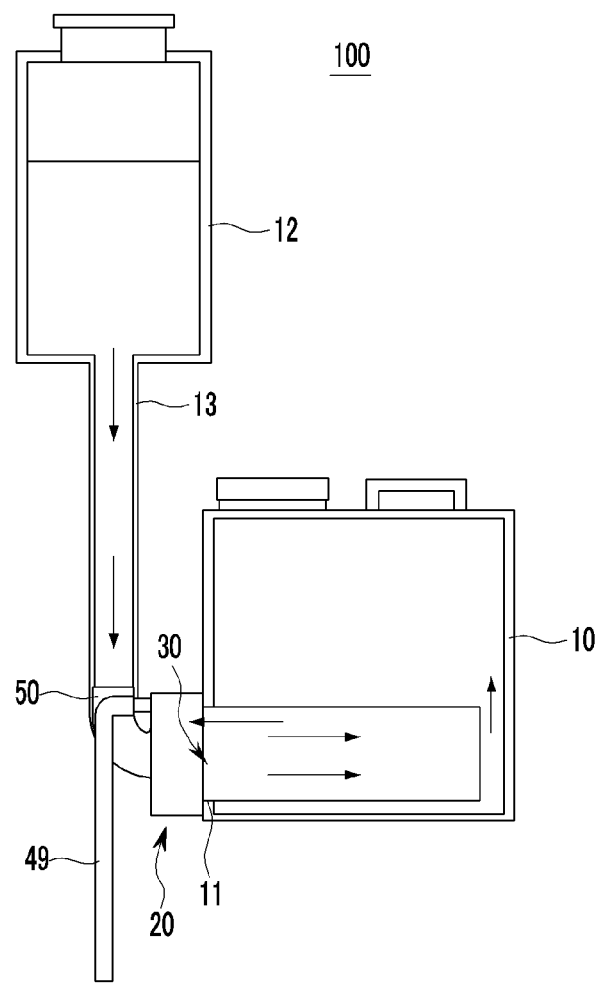
FIG. 1 is a schematic diagram illustrating a water treatment device including a hollow fiber membrane module according to the present exemplary embodiment.

In the following detailed description, only certain exemplary embodiments of the present invention have been shown and described, simply by way of illustration. As easily understood by the person with ordinary skill in the art to which the present invention pertains, the exemplary embodiments which will be described below may be variously modified without departing from the spirit and the scope of the present invention. If possible, the same or similar portions are represented by using the same reference numerals in the drawings.

The terminologies used herein are set forth to illustrate a specific exemplary embodiment, but do not intend to limit the present invention. Singular expressions used herein include plural expressions unless they have definitely opposite meanings. It will be further understood that the terms "comprises" and/or "comprising," when used in this specification, specify the presence of stated properties, regions, integers, steps, operations, elements, and/or components, but do not preclude the presence or addition of one or more other properties, regions, integers, steps, operations, elements, components, and/or groups.

All terms including technical terms and scientific terms used herein have the same meaning as the meaning generally understood by the person with ordinary skill in the art to which the present invention pertains. Terms defined in generally used dictionary shall be construed that they have meanings matching those in the context of a related art, and shall not be construed in ideal or excessively formal meanings unless they are clearly defined in the present application.

Hereinafter, in the present exemplary embodiment, a water treatment device in which an isolation membrane on which a water treatment is performed is a hollow fiber membrane will be described as an example. The present invention is not limited thereto, and is applicable to every water treatment device as long as the water treatment device includes an isolation membrane filtering raw water by a pressure difference.

FIG. 1 illustrates a water treatment device including a hollow fiber membrane module according to the present exemplary embodiment.

As illustrated in FIG. 1, a water treatment device 100 according to the present exemplary embodiment includes one or more water containers 10 into which raw water flows to be accommodated, a hollow fiber membrane module 20 installed in the water container 10, provided with a hollow fiber membrane 44 (see FIG. 6) therein, and performing water treatment by water pressure of the raw water of the container 10, and a raw water supplying part positioned on the container 10 and supplying raw water into the water container 10 through the hollow fiber membrane module 20.

The water treatment device of the present exemplary embodiment has a structure that makes raw water collide with a hollow fiber membrane of the hollow fiber membrane module to move the hollow fiber membrane in a process of supplying raw water from the raw water supplying part to the water container. Accordingly, the hollow fiber membrane is washed without separate external power.

The raw water supplying part may include a raw water container 12 in which raw water is accommodated, and a raw water pipe 13 connecting the raw water container 12 and the hollow fiber membrane module 20. The raw water supplying part is disposed at a relatively higher position than the water container 10 in which the hollow fiber membrane module 20 is installed, to supply raw water to the water container by using potential energy formed by a height difference. The hollow fiber membrane module 20 is provided with a supply pipe 50 at a front end of one side thereof to be connected with the raw water pipe.

Accordingly, the raw water supplied from the raw water container 12 to the water container 10 collides with the hollow fiber membrane provided in the hollow fiber membrane module 20 through the hollow fiber membrane module 20 and then flows into the water container 10. During the process, the raw water shakes the hollow fiber membrane by applying physical energy to the hollow fiber membrane. Accordingly, it is possible to prevent contaminants from being stacked on a surface of the hollow fiber membrane and to remove stacked contaminants while the hollow fiber membrane is shaken. Accordingly, the raw water is supplied to the water container by potential energy and simultaneously the hollow fiber membrane is continuously washed by using the energy. A structure of the washed hollow fiber membrane module 20 will be described in more detail below.

The water container 10 is a vessel filled with raw water, and in the present exemplary embodiment, the water container 10 may have a predetermined form or size according to a designed capacity, or may adopt a globally commonly used standardized container, vessel, drum, or container. Accordingly, it is possible to easily switch a standardized container or drum used in the related art into a water container for use.

A fastener 11 for coupling with the hollow fiber membrane module 20 is installed on one surface of the water container 10.

The fastener 11 may have a structure in which, for example, a male thread or a female thread is formed on an external peripheral surface or an internal peripheral surface thereof. The hollow fiber membrane module 20 may be formed with a female thread or a male thread corresponding to the fastener 11 to be screw-engaged with the fastener. Accordingly, it is possible to easily attach and detach the hollow fiber membrane module 20 to and from the water container 10.

The raw water container 12 accommodates raw water supplied to the water container 10. The raw water container 12 is disposed at an upper side of the water container 10 to enable the raw water inside the raw water container 12 to smoothly flow into the hollow fiber membrane module 20. When the raw water container 12 is further spaced apart from the hollow fiber membrane module 20 in a vertical direction, potential energy formed by a height difference is increased, so that a flow speed of the raw water flowing into the hollow fiber membrane module 20 may be increased. Accordingly, kinetic energy of the raw water applied to the hollow fiber membrane is increased, to better shake the hollow fiber membrane.

Figure 2:
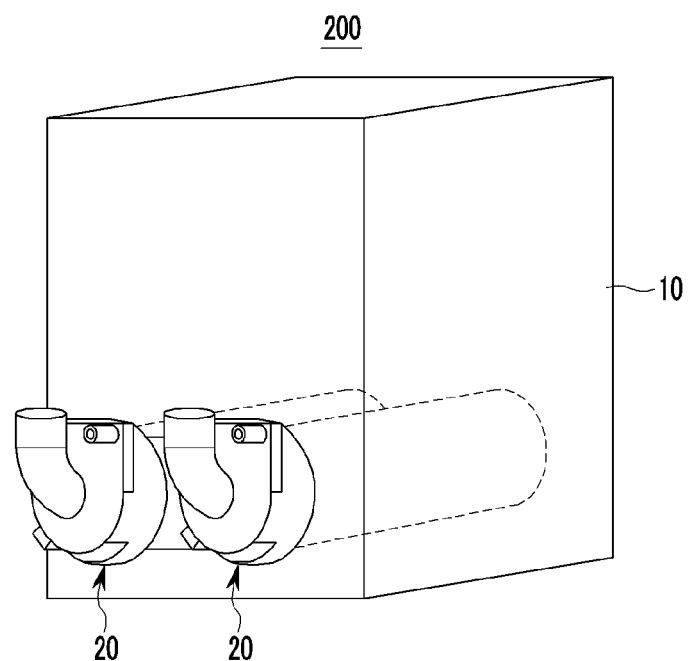
FIGS. 2 to 7 are diagrams illustrating water treatment devices according to other exemplary embodiments.
Figure 3:
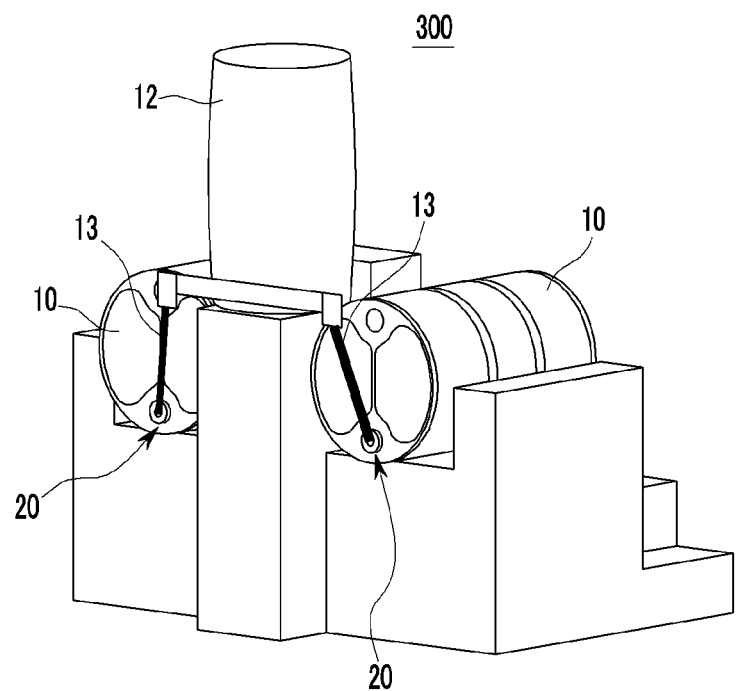

FIGS. 2 and 3 are diagrams illustrating water treatment devices according to other exemplary embodiments.

As illustrated in FIG. 2, in a water treatment device 200, a plurality of hollow fiber membrane modules 20 may be installed in a water container 10. FIG. 2 exemplifies the structure in which two hollow fiber membrane modules 20 are installed in the water container 10, but three or more hollow fiber membrane modules 20 rather than two may be installed.

FIG. 3 illustrates a water treatment device 300 in which one raw water container 12 is coupled with a plurality of water containers 10. In the present exemplary embodiment, a standardized drum is used as a raw water container and a water container. As illustrated in FIG. 3, a hollow fiber membrane module 20 is installed in each of the two water containers 10, and one raw water container 12 disposed at a center is connected with the hollow fiber membrane module 20 of each water container 10 to receive raw water. A valve is installed in the raw water pipe 13, through which the raw water container 12 is connected with the hollow fiber membrane module 20 of each water container 10, thereby adjusting the amount of raw water supplied. Three or more water containers rather than two may be provided to be connected to the raw water container.

As illustrated in FIGS. 1 to 3, the structure of the water treatment device may be varied by changing the number or a disposition structure of each of the water container 10 and the raw water container 12, or the number of hollow fiber membrane modules 20 installed in the water container. All of the modified structures may belong to the spirit of the present invention.

Figure 4:
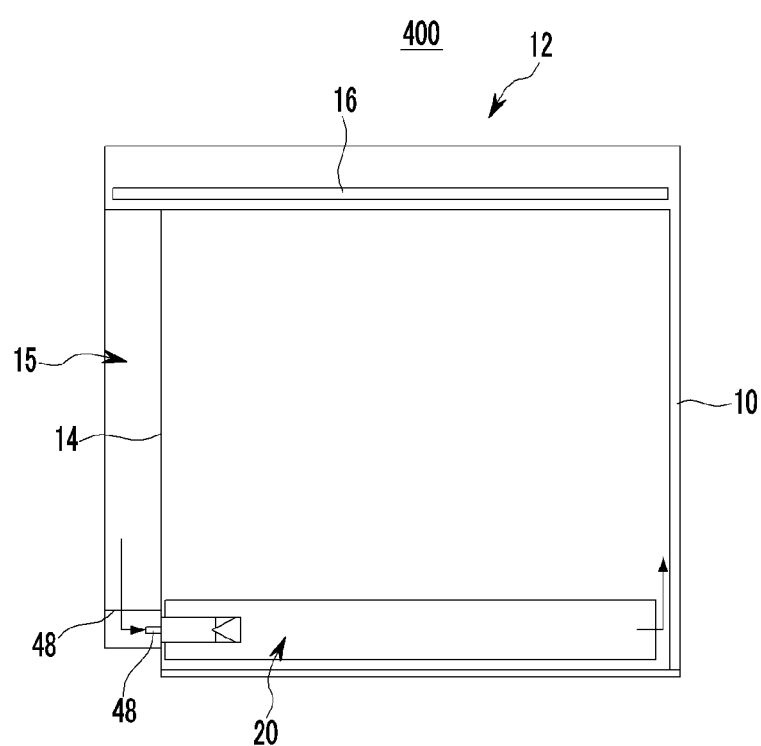

FIG. 4 illustrates a water treatment device according to another exemplary embodiment.

As illustrated in FIG. 4, a water treatment device 400 may have a structure in which a raw water container 12 supplying raw water is integrally formed with an upper end of a water container 10, into which raw water flows to be accommodated, a partition wall 14 communicated with the raw water container 12 is vertically extended and installed inside the water container 10 to form a movement passage 15 of raw water, and a hollow fiber membrane module 20 is mounted at a lower end of the partition wall 14 to receive raw water through the movement passage. The hollow fiber membrane module is mounted in the partition wall 14 within the water container so that an injection pipe 52 (see FIG. 9) inside the hollow fiber membrane module is communicated with the movement passage. Further, a treated water pipe 48, which is installed at a front end of the hollow fiber membrane module and through which treated water treated by the hollow fiber membrane is discharged, is extended to the outside of the water container through the partition wall and discharges the treated water to the outside of the water container.

In the present exemplary embodiment, the raw water container 12 may be formed by installing an isolation plate 16 inside the upper portion of the water container 10 in a horizontal direction and isolating the water container 10 in a vertical direction. The isolation plate 16 is connected with the partition wall 14, so that an inner space above the isolation plate is communicated with the movement passage 15 that is an inner space of the partition wall. The movement passage 15 is communicated with a space under the isolation plate through the hollow fiber membrane module 20 installed in the partition wall 14.

That is, the space above the isolation plate 16 in the inner space of the water container forms the raw water container 12, the space under the isolation plate forms the water container 10, and the raw water container above the isolation plate and the water container under the isolation plate are communicated with each other through the movement passage 15. Accordingly, the raw water of the raw water container 12 positioned at a relatively higher side flows down along the movement passage 15 formed by the partition wall and flows into the hollow fiber membrane module through a supply pipe installed in the partition wall to be supplied to the water container.

Here, the isolation plate 16 is formed to be inclined in a downward direction toward the partition wall 14 to enable the raw water to smoothly flow down to the movement passage 15 formed by the partition wall.

As described above, in the case of the exemplary embodiment of FIG. 4, the movement passage 15 for transferring raw water to the water container 10 is integrally formed with the raw water container 12 storing raw water, so that it is not necessary to equip a separate configuration part for supplying raw water. Accordingly, the water treatment device may be completely assembled by mounting the hollow fiber membrane module 20 to the partition wall 14 formed inside the water container 10 and connecting the hollow fiber membrane module 20 with the movement passage.

The hollow fiber membrane module 20 mounted in the water container 10 includes a plurality of hollow fiber membranes and filters the raw water of the water container 10. Each hollow fiber membrane module 20 is detachably/attachably coupled to the water container 10. Air-tightness is maintained between the water container 10 and the hollow fiber membrane module 20 to prevent the raw water from leaking. A sealing member is further installed between the water container 10 and the hollow fiber membrane module 200 for maintaining air-tightness.

In the present exemplary embodiment, the hollow fiber membrane module 20 filters raw water with no power by using a pressure difference by water head. In order to increase external pressure applied to the hollow fiber membrane, the hollow fiber membrane module 20 is disposed at a bottom side of the water container 10.

Figure 5:
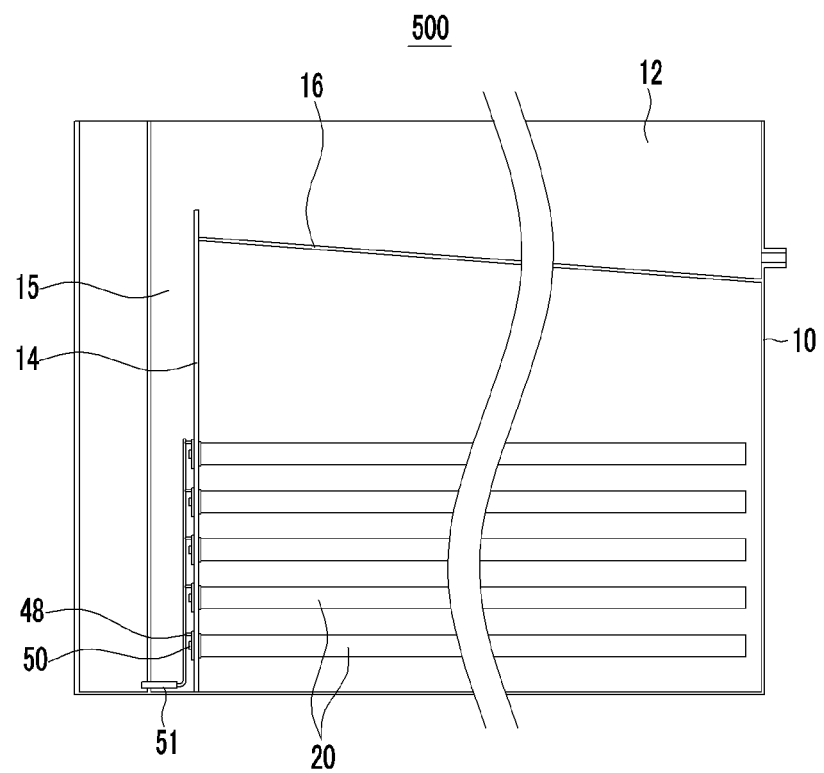

FIG. 5 exemplifies a structure in which a container for loading is used as a water treatment device according to another exemplary embodiment of the water treatment device. The present exemplary embodiment is not limited to the container, and is applicable to all large structures, such as a large water container.

As illustrated in FIG. 5, in the present water treatment device 500, the isolation plate 16 is installed in a horizontal direction at an inner upper portion of the water container 10 formed of a container to form the raw water container 12 isolated from the water container on the upper portion of the water container 10, and the partition wall 14 connected to the isolation plate to be extended in the vertical direction is installed to form the movement passage 15 through which raw water moves. Further, the plurality of hollow fiber membrane modules 20 are mounted on the partition wall 14, so that the hollow fiber membrane modules 20 are disposed within the water container 10. The hollow fiber membrane module installed on the partition wall 14 is installed in the partition wall 14 within the water container so that supply pipes 50 installed at the front end of the hollow fiber membrane module are communicated with the movement passage 15. In the present exemplary embodiment, the treated water pipe 48, through which treated water water-treated by each hollow fiber membrane module is discharged, is connected to a common discharge line 51. The discharge line 51 may be connected to a separate space of the container forming the water container or extended to an external side of the container to discharge the treated water.

Here, the isolation plate 16 is formed to be inclined in an upward direction toward the partition wall 14, so that precipitates on the bottom of the raw water container 12 may be discharged to the outside without entering the movement passage 15. Since a large water treatment device has a high possibility of external contaminants flowing into the raw water container, it is possible to further minimize contamination of the hollow fiber membrane by preventing the contaminants precipitated on the bottom of the raw water container from being supplied to the hollow fiber membrane module.

As described in the present exemplary embodiment, it is possible to increase a processing capacity by implementing the water treatment device by using a water container having a large capacity, such as a large container.

Figure 6:
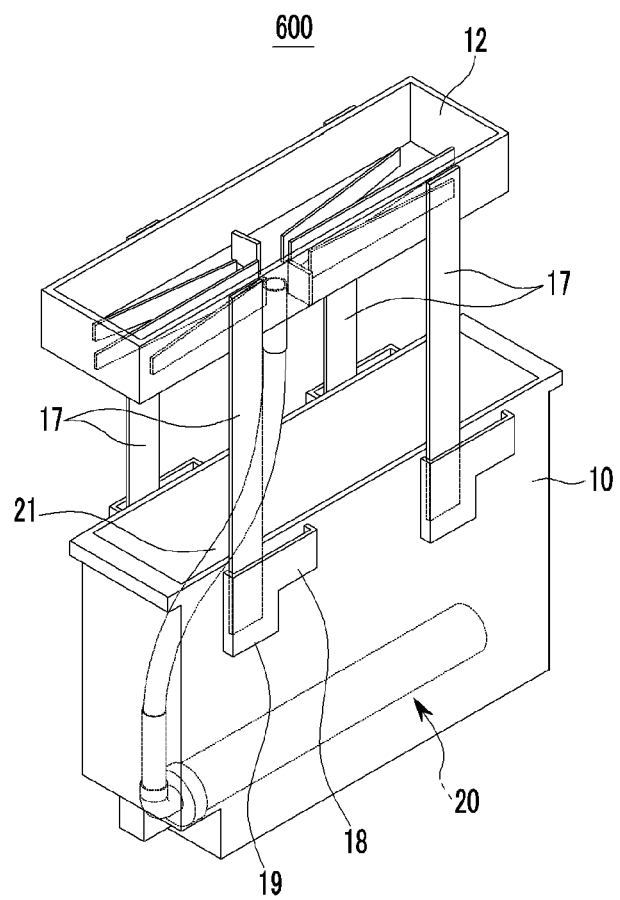
Figure 7:
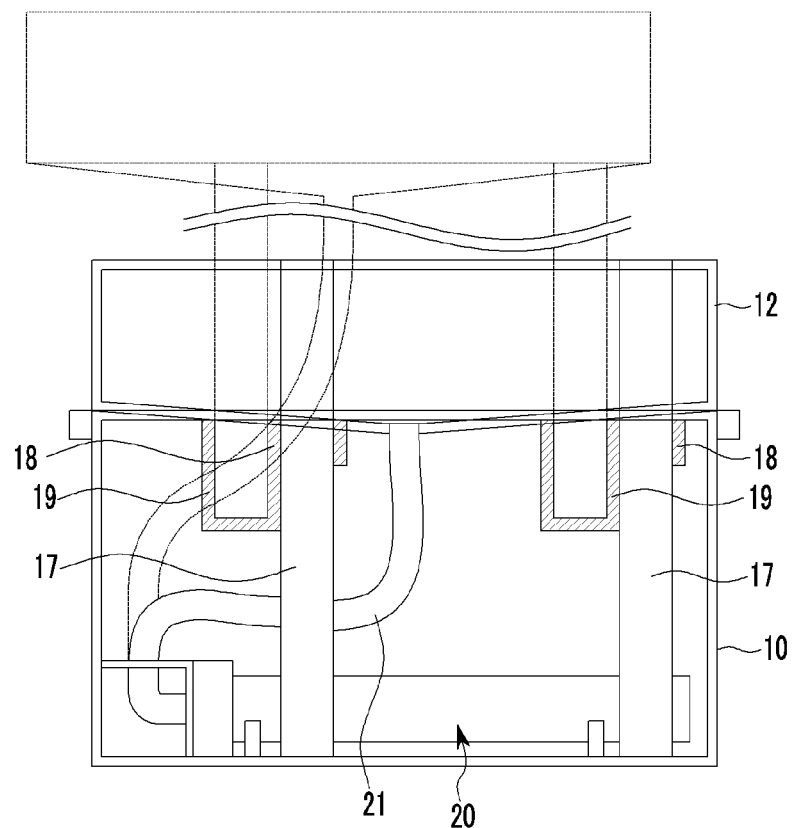

FIGS. 6 and 7 illustrate another exemplary embodiment of the water treatment device.

A water treatment device 600 of the present exemplary embodiment includes a water container 10 into which raw water flows to be accommodated, a hollow fiber membrane module 20 installed in the water container 10 to perform water treatment, a raw water container 12 positioned on the water container 10, and a hose 21 connecting the raw water container and the hollow fiber membrane module, and the raw water container 12 is detachably/attachably installed in an upper end of the water container 10.

The raw water container 12 is laid at the upper end of the water container 10 of which the upper end is opened to form a cover covering the water container, and the raw water container is spaced apart from the upper end of the water container as necessary to perform a required operation.

To this end, supports 17 extended in the downward direction are installed on lateral surfaces of the raw water container 12, a guide holder 18, which is installed at a position corresponding to a formed position of the support 17 and has opened upper and lower ends, and through which the support passes, and a supporting holder 19, which is installed next to the guide holder 18 and has an opened upper end and a closed lower end, and into which the support is fitted to be supported, are installed on an upper portion of the lateral surface of the water container 10.

The supports 17 are installed on both facing external peripheral surfaces of the raw water container as illustrated in FIG. 6, respectively. The number of supports installed is not particularly limited. The support 17 may be installed in the raw water container 12 in the vertical direction in a structure extended in a straight form. The support may approximately have a length to the extent that a lower end of the support is proximate to a lower portion of the water container when the raw water container is laid on the upper end of the water container. Based on a case where the raw water container 12 is accurately laid on the upper end of the water container 10, the guide holder 18 is installed on the lateral surface of the water container at the position corresponding to the support 17. The guide holder 18 has a cross-sectional structure corresponding to that of the support so that the support is slidably inserted into the guide holder 18, and has opened upper and lower ends. Accordingly, when the support 17 is fitted into the guide holder 18, the support passes the lower end of the guide holder and continuously slides, so that the raw water container 12 moves toward the water container and is laid on the upper end of the water container in the form of a cover.

The supporting holder 19 is positioned just next to the guide holder 18 and installed on an external peripheral surface of the water container 10. The supporting holder 19 has a cross-sectional structure corresponding to that of the support so that the support 17 may be fitted into the supporting holder 18, similar to the guide holder, and has an opened upper end and a closed lower end. A length in the vertical direction of the supporting holder 19 is sufficient as long as the support may be sufficiently fixed, and is not particularly limited. Accordingly, when the support 17 is fitted into the supporting holder 19, the support is fitted into the supporting holder to be erected while the lower end of the support is caught by the closed lower end of the supporting holder 19. Accordingly, the raw water container 12 is lifted and spaced apart from the water container by the support 17 fitted into the supporting holder 19, and the upper end of the water container is opened. Accordingly, a required operation may be performed while the upper end of the water container is maintained in an opened state.

Here, the raw water container 12 is provided with an outlet connected with the hose on the bottom surface thereof, and the bottom surface is formed to be inclined in the downward direction toward the outlet to enable raw water to smoothly flow toward the hose. Further, the hose 21 is formed of a flexible material, and is freely bent when the raw water container moves with respect to the water container, so that a connection state between the raw water container and the hollow fiber membrane module may be continuously maintained.

Accordingly, the raw water container 12 may be laid on the upper end of the water container 10 while being in contact with the upper end of the water container 10 by fitting the support 17 into the guide holder 18, or the raw water container may be spaced apart from the upper end of the water container to open the upper end of the water container by fitting the support 17 into the guide holder 18 as necessary.

The hollow fiber membrane module of the present exemplary embodiment has a structure in which raw water collides with the hollow fiber membrane by using kinetic energy of injected raw water to shake and wash the hollow fiber membrane. Accordingly, it is possible to minimize contamination of the hollow fiber membrane through a supply of raw water without using a separate power source for washing the hollow fiber membrane.

Figure 8:
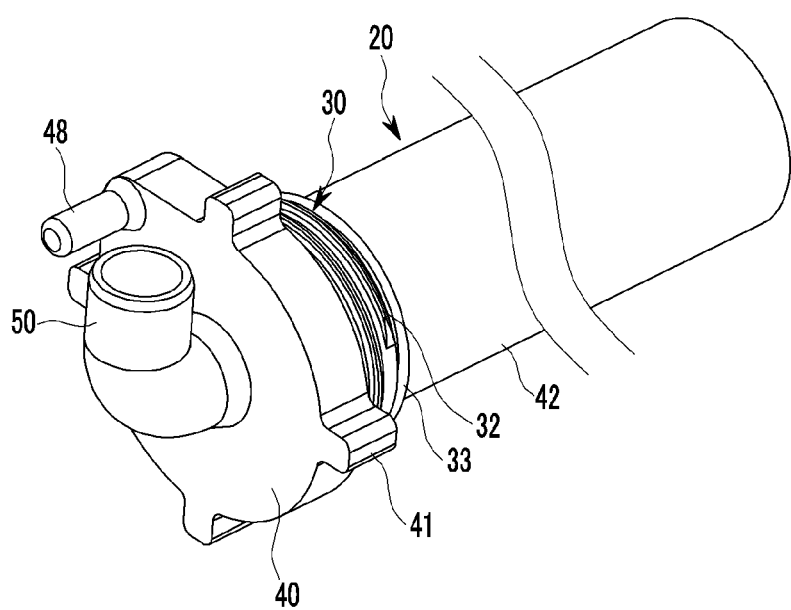
FIG. 8 is a perspective view illustrating a hollow fiber membrane module according to the present exemplary embodiment.
Figure 9:
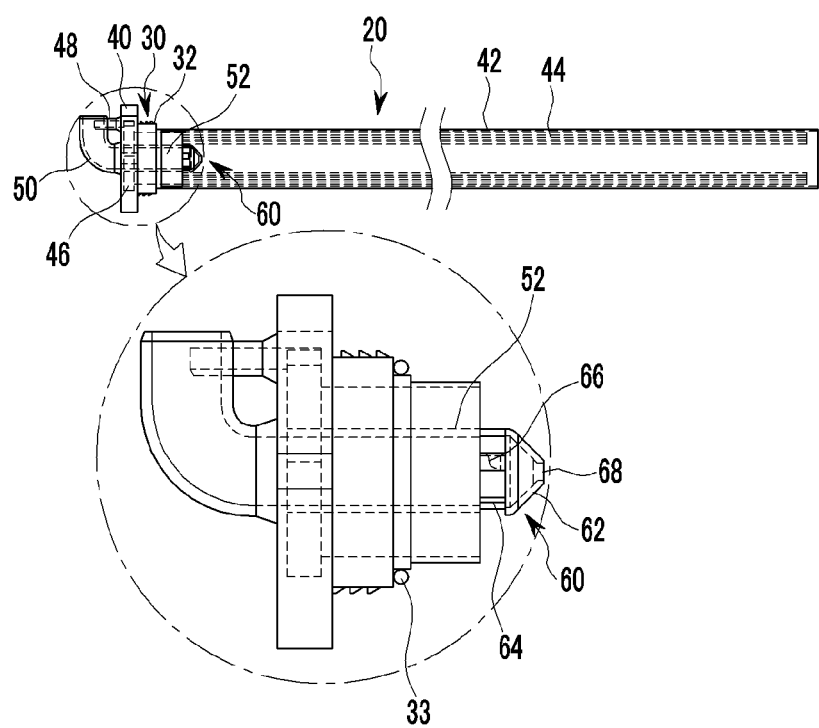
FIG. 9 is a cross-sectional side view illustrating the hollow fiber membrane module according to the present exemplary embodiment.

FIGS. 8 and 9 illustrate a structure of the hollow fiber membrane module according to the present exemplary embodiment.

In the present exemplary embodiment, the hollow fiber membrane module 20 includes a header 40 coupled with the water container 10 in which raw water is accommodated, a housing 42 installed at the header 40 and extended into the water container 10, and a hollow fiber membrane 44 provided inside the housing 42 and performing water treatment by a pressure difference.

Further, the hollow fiber membrane module further includes a collector 46 installed at the header 40 and connected with the hollow fiber membrane 44 to collect treated water, the treated water pipe 48 connected with the collector 46 to discharge the treated water, the supply pipe 50 installed at the header 40 to supply raw water, the injection pipe 52 connected to the supply pipe 50 and extended into the housing 42 to discharge raw water, and a raw water distributing part 60 installed at a front end of the injection pipe 52 to make the raw water discharged through the injection pipe 52 collide with the hollow fiber membrane 44.

The header 40 includes a fastening part 30 for coupling with the water container 10 so that the hollow fiber membrane module 20 is detachably/attachably mounted to the water container 10. The header 40 is coupled to the fastener 11 installed on the lateral surface of the water container 10. The fastener 11 has a structure engaged with the fastening part 30 of the header 40.

In the present exemplary embodiment, the fastening part 30 has a structure in which a male thread 32 is formed on an external peripheral surface of the fastening part 30 as illustrated in FIG. 8. Accordingly, the fastener 11 installed in the water container 10 may have a structure in which a male thread is formed on the internal peripheral surface thereof so as to be fastened with the male thread. Accordingly, the header 40 may be coupled to the water container by a screw engagement method.

Figure 10:
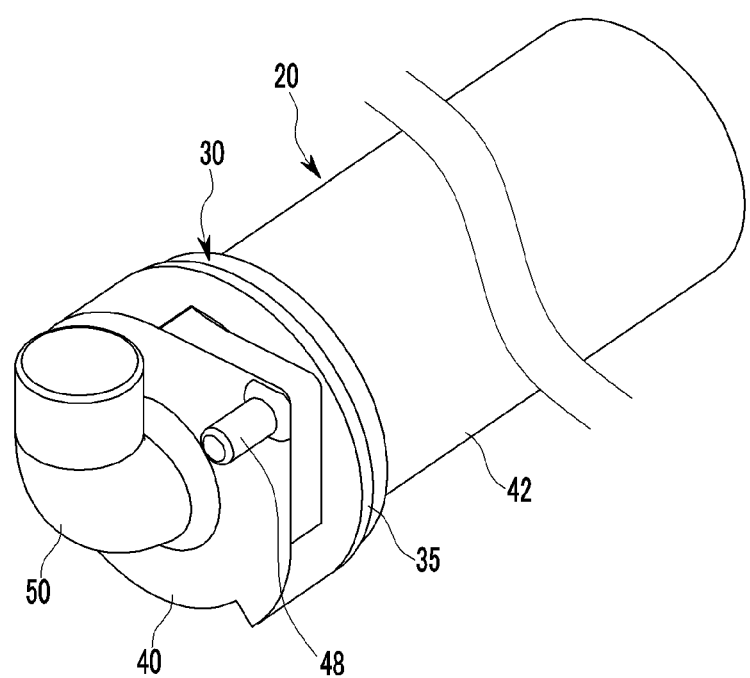
FIG. 10 is a perspective view illustrating a hollow fiber membrane module according to another exemplary embodiment.
Figure 11:
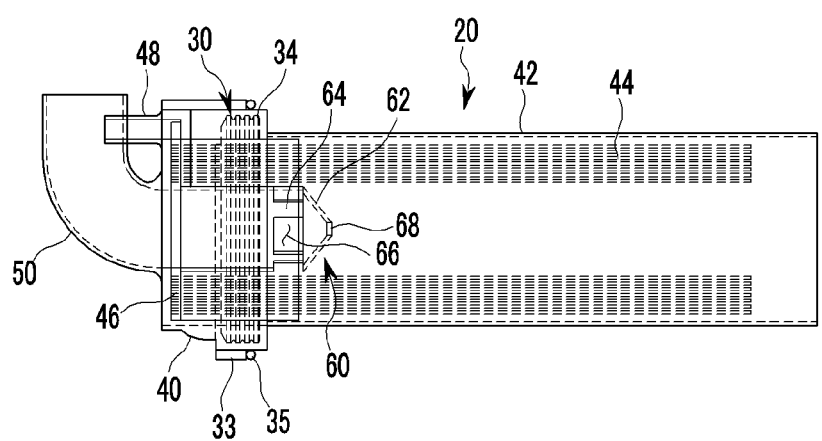
FIG. 11 is a cross-sectional side view illustrating a hollow fiber membrane module according to another exemplary embodiment.

FIGS. 10 and 11 illustrate a fastening part of a hollow fiber membrane module according to another exemplary embodiment.

Other configuration parts, except for the structure of a fastening part 30, in a hollow fiber membrane module 20 of the present exemplary embodiment have the same structures as the aforementioned structures, and hereinafter, the same constituent elements are denoted by the same reference numerals, and a detailed description thereof will be omitted.

As illustrated in FIGS. 10 and 11, in the hollow fiber membrane module 20 in the present exemplary embodiment, the fastening part 30 may have a structure in which a female thread 34 is formed on an internal peripheral surface thereof. In response, a fastener 11 installed in the water container 10 is formed with a male thread on an external peripheral surface thereof and has a circular pipe structure protruding to the external side, and may have a structure of being fastened with the female thread 34 of the fastening part.

A specification such as a size of the male thread 32 or the female thread 34 of the fastening part 30 may be variously modified, and for example, the male thread 32 or the female thread 34 of the fastening part 30 may be mounted to the water container 10 used anywhere in the world by forming the male thread 32 or the female thread 34 of the fastening part 30 in accordance with the international standard.

Further, in the present exemplary embodiment, sealing members 33 and 35 for maintaining air-tightness between the header 40 and the water container are further installed in the fastening part. The sealing members 33 and 35 may be installed at an internal side or an external side of the fastening part 30. In a case of a structure in which the sealing member 35 is installed at the external side of the fastening part 30, the sealing member 35 may be laid on a stepped jaw formed by performing step-processing along an external peripheral surface of the fastening part. In the structure, when the fastening part 30 of the module is forcibly fitted to the fastener of the water container, the sealing member 35 is in close contact between the external peripheral surface of the water container and the fastener to maintain air-tightness.

Figure 12:
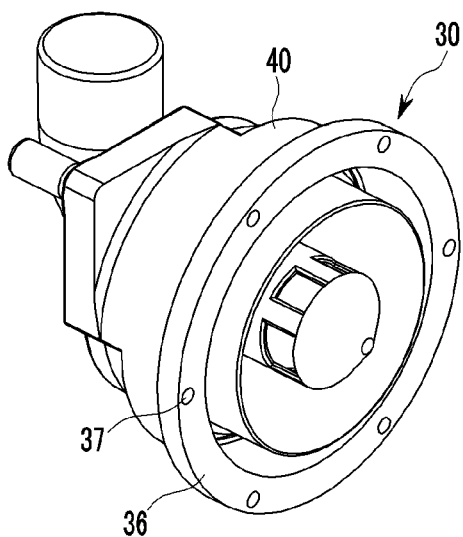
FIG. 12 is a perspective view illustrating a structure of a fastening unit of a hollow fiber membrane module according to another exemplary embodiment.

FIG. 12 illustrates a fastening part in the hollow fiber membrane module according to another exemplary embodiment. As illustrated in FIG. 12, the fastening part 30 is formed with a flange 36 protruding toward an external side of the header, and the flange 36 is formed with a plurality of fastening holes 37, through which bolts pass, at intervals. Accordingly, the flange 36 of the module is fastened with the water container by using the bolts and the like while the flange 36 faces the external peripheral surface of the water container, so that the hollow fiber membrane module may be mounted in the water container.

Figure 13:
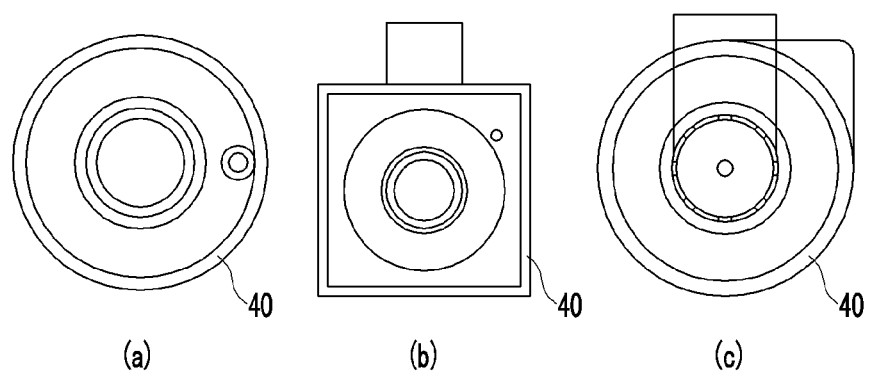
FIG. 13 (a) to (c) are diagrams illustrating various header structures of the hollow fiber membrane module according to the present exemplary embodiment.

FIG. 13 (a) to (c) exemplify various forms of the header. As illustrated in FIG. 13 (a) to (c), the header 40 has a circular shape, a quadrangular shape, or a circular structure having quadrangular corners. The form of the header may be variously modified, and is not particularly limited.

Here, the header 40 needs to be rotated in a predetermined direction so as to be screw-engaged with the water container 10. Accordingly, as illustrated in FIG. 8, protrusions 41 may protrude from the external peripheral surface of the header 40 at intervals so as to easily rotate the header 40. Accordingly, even if the header 40 has a circular structure, it is possible to easily rotate the header.

When the header 40 is coupled with the water container 10, the header 40 is installed while being in close contact with the lateral surface of the water container 10, and the housing 42 installed on an internal peripheral surface of the header 40 is inserted into the water container 10.

One end of the housing 42 is coupled with the header 40, and the other end thereof has an opened cylindrical shape.

The shape of the housing 42 is not limited to the cylindrical shape, and the housing 42 may have various shapes, such as a rectangular container or a polygonal cross-section shape.

The housing 42 serves to surround and protect the hollow fiber membrane 44, and transfer kinetic energy of the raw water discharged through the raw water distributing part 60 to the entire hollow fiber membrane 44.

The collector 46 is installed inside the header 40. In the present exemplary embodiment, an internal space of the header 40 forms the collector 46. The injection pipe 52, through which raw water is discharged, is installed while passing through a center of the collector 46. The injection pipe 52 is extended from the collector 46 into the housing 42 by a predetermined length.

The supply pipe 50 is installed on the external peripheral surface of the header 40. The supply pipe 50 is connected to the injection pipe 52 installed at the center of the collector 46. Accordingly, the raw water supplied through the supply pipe 50 passes the center of the collector 46 through the injection pipe 52 and is discharged into the housing.

Figure 14:
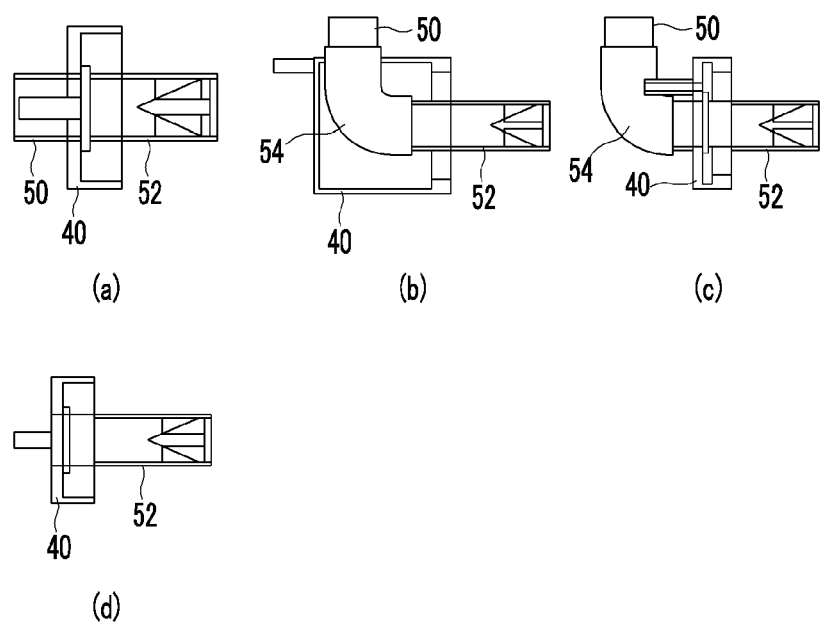
FIG. 14 (a) to (d) are diagrams illustrating various supply tube structures of the hollow fiber membrane module according to the present exemplary embodiment.

FIG. 14 (a) to (d) exemplify various structures of the header 40 coupled with the supply pipe 50. The supply pipe 50 may be installed through a front surface of a lateral surface of the header. As illustrated in FIG. 14 (a), the supply pipe 50 is coupled with the front surface of the header 40 to be straightly connected with the injection pipe 52. FIGS. 14 (b) and (c) exemplify a structure in which the supply pipe 50 is disposed on the header 40 at an angle of 90° with respect to the injection pipe 52. In the structure, the injection pipe 52 and the supply pipe 50 are connected through an elbow pipe 54 bent at 90°. FIG. 14 (b) exemplifies a structure in which the elbow pipe 54 is provided inside the header, and a front end of the elbow pipe 54 is positioned on the header. In the case of FIG. 14 (d), there is no supply pipe 50, so that the header may be directly connected to a water tank and the like, in which raw water is stored.

As described above, the hollow fiber membrane module may be used in various forms by varying the structures of the header and the supply pipe 50.

The raw water flowing into the supply pipe 50 passes the center of the collector 46 through the injection pipe 52 and is discharged into the housing 42. Accordingly, in the present exemplary embodiment, the raw water is supplied into the water container 10 through the housing 42. Therefore, inflow energy of the raw water supplied through the housing in the raw water supply process may be applied to the hollow fiber membrane laid inside the housing.

Figure 15:
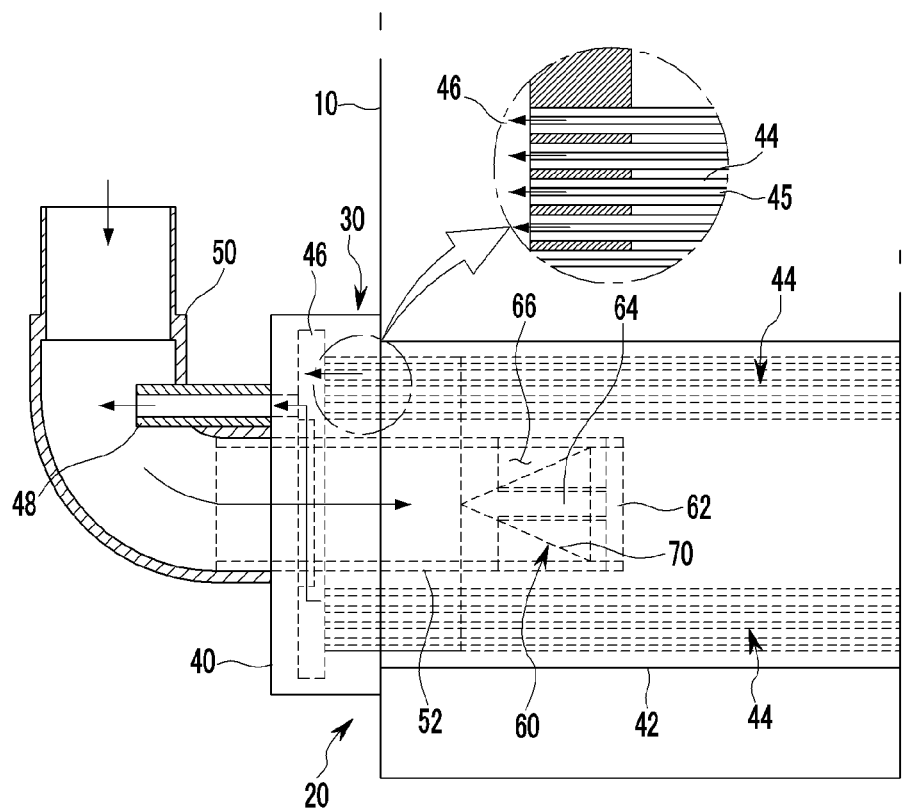
FIG. 15 is a schematic diagram for describing an action of the hollow fiber membrane module according to the present exemplary embodiment.

As illustrated in FIG. 15, one end of the hollow fiber membrane 44 is coupled with the collector 46, so that an inner passage 45 is communicated with the collector 46. The hollow fiber membrane 44 is coupled with the collector 46 along a peripheral area of the injection pipe 52. Accordingly, the hollow fiber membrane 44 is disposed in a space between the injection pipe 52 installed at the center of the collector 46 and the housing 42. Accordingly, the present hollow fiber membrane module 20 has a structure in which the injection pipe 52 is disposed at a center portion of the hollow fiber membrane 44 to supply raw water. As described above, the raw water is supplied to the center portion of the hollow fiber membrane, so that it is possible to evenly distribute and inject the raw water into the entire hollow fiber membrane through the raw water distributing part.

One end of the hollow fiber membrane 44 is coupled with the collector 46 and the hollow fiber membrane 44 is extended along the housing 42, and the other end of the hollow fiber membrane 44 is not restricted to form a freely movable free end.

Accordingly, the hollow fiber membrane 44 may be shaken well even with less kinetic energy, thereby maximizing a washing effect by raw water.

The treated water pipe 48 is installed on the external peripheral surface of the header 40, and is communicated with the collector 46 inside the header 40. The treated water collected in the collector 46 connected with the hollow fiber membrane 44 is discharged to the outside of the hollow fiber membrane module 20 through the treated water pipe 48. The treated water pipe 48 may be elongated in the downward direction by installing a separate hose 49 (see FIG. 1) and the like. The hose 49 extended in the downward direction applies suction pressure by the siphon principle to the hollow fiber membrane 44. Accordingly, it is possible to improve water treatment performance by increasing effective permeation pressure of the hollow fiber membrane 44.

The raw water distributing part 60 induces the raw water supplied to the center of the housing 42 through the injection pipe 52 into an internal peripheral surface of the housing 42 so that the raw water collides with the hollow fiber membrane 44.

To this end, the raw water distributing part 60 of the present exemplary embodiment includes a blocking member 62 installed at a front end of the injection pipe 52 to block a movement of the raw water, and a plurality of outlets 66 formed along an external peripheral surface of a front end of the injection pipe 52 at intervals to discharge the raw water. A space between the outlets forms a supporting member 64 supporting the blocking member 62. That is, the raw water is discharged to the outlets 66 formed between the supporting members 64, and the blocking member 62 is fixed to an end of the supporting member.

Accordingly, the raw water flowing into the injection pipe 52 is blocked by the blocking member 62 and fails to be directly discharged to the center of the housing 42, but is radially ejected through the outlets 66 formed between the blocking member 62 and the front end of the injection pipe 52. Accordingly, the raw water is ejected into the hollow fiber membrane 44 disposed along the external peripheral portion of the injection pipe 52 and physical energy by the flow of the raw water is applied to the hollow fiber membrane 44, so that the hollow fiber membrane 44 is shaken within the housing 42. As described above, contaminants may be washed by moving the hollow fiber membrane 44 by using kinetic energy generated during the supply of the raw water without a separate power source.

The supporting member 64 is fixed in a state where the blocking member 62 is spaced apart from the front end of the injection pipe 52. The outlets 66 are evenly formed along a circumferential direction of the injection pipe 52. The form of the outlet 66 may be variously modified, and is not particularly limited. Accordingly, the raw water ejected from the outlets 66 is evenly ejected to an entire surface of the internal peripheral surface of the housing 42.

In the present exemplary embodiment, the blocking member 62 may have a flat structure, and may have a conic form protruding to the outside as illustrated in FIGS. 9 and 11. Further, a hole 68 may be further formed at a center of the blocking member 62 so as to partially discharge the raw water.

Further, as illustrated in FIGS. 14 and 15, the raw water distributing part 60 further includes a conic-shaped inducing member 70 which is installed inside the blocking member 62, and has a gradually decreasing diameter toward the injection pipe 52.

The inducing member 70 may be integrally formed with the blocking member 62. An inclination angle of a lateral surface of the inducing member 70 may be variously changed, and is not particularly limited.

Accordingly, the raw water discharged from the injection pipe 52 flows out along the inclined lateral surface of the inducing member 70 and is ejected toward the hollow fiber membrane 44. The inducing member 70 induces the raw water to more smoothly flow toward the hollow fiber membrane 44, thereby minimizing loss of energy of the flow of the raw water.

Hereinafter, an action of the present exemplary embodiment will be described with reference to FIG. 15.

In the present exemplary embodiment, raw water is supplied to the water container 10 by using potential energy formed by a height difference between the raw water container and the water container without a separate external power source. The raw water stored in the raw water container positioned at a relatively high position is supplied to the water container positioned at a relatively low position. In this case, the raw water is supplied to the water container through the hollow fiber membrane module 20 installed in the water container.

The raw water is supplied to the hollow fiber membrane module through the supply pipe 50. The raw water supplied through the supply pipe 50 flows into the housing 42 through the injection pipe 52 and then passes through the housing 42 to be filled inside the water container 10, in which the hollow fiber membrane module 20 is installed.

In the process, the raw water flows out to the hollow fiber membrane 44 from the front end of the injection pipe 52 to collide with the hollow fiber membrane 44. That is, as illustrated in FIG. 15, a flow direction of the raw water discharged to the center of the housing 42 through the injection pipe 52 is changed toward the internal peripheral surface of the housing 42 by the inducing member 70 installed in the blocking member 62 at the front end of the injection pipe 52. Accordingly, the raw water is ejected toward the hollow fiber membrane 44 through the outlets 66 between the front end of the injection pipe 52 and the blocking member. Accordingly, kinetic energy of the raw water ejected from the injection pipe 52 is applied to the hollow fiber membrane 44, so that the hollow fiber membrane 44 flows.

As described above, contaminants attached onto the surface of the hollow fiber membrane 44 may be removed by moving the hollow fiber membrane 44 by using the flow of the raw water in the process of supplying the raw water to the water container 10. Further, it is possible to minimize attachment of contaminants onto the surface of the hollow fiber membrane 44 and maintain a state in which washing is not required over a long time by continuously moving the hollow fiber membrane 44 during the continuous supply of the raw water.

The raw water passes through the hollow fiber membrane 44 and is filtered by water head pressure of the raw water filled in the water container. Treated water filtered into the internal passage 45 of the hollow fiber membrane 44 is collected in the collector 46 and is discharged to the outside through the treated water pipe 48 installed in the collector.

As described above, the water treatment device of the present exemplary embodiment washes the hollow fiber membrane in the raw water supply process without the supply of electricity or external power, so that it is possible to use the hollow fiber membrane over a long time even without separate management.

Further, a drum, a water container, a container, and the like, which are globally and commonly used, may be utilized as the water treatment device, so that it is easy to use the water treatment device and it is possible to increase utilization of the water treatment device.

As described above, exemplary embodiments of the present invention have been illustrated and described, but various modifications and other exemplary embodiments may be performed by those skilled in the art. The modifications and the other exemplary embodiments are all considered and included in the appended claims, which fall within the spirit and scope of the present invention.

DESCRIPTION OF SYMBOLS

| | |
|---|---|
| 10: Water container | 11: Fastener |
| 12: Raw water container | 13: Raw water pipe |
| 14: Partition wall | 15: Movement passage |
| 16: Isolation plate | 17: Support |
| 18: Guide holder | 19: Supporting holder |
| 20: Hollow fiber membrane module | 21: Hose |
| 30: Fastening part | 32: Male thread |
| 33, 35: Sealing member | 34: Female thread |
| 36: Flange | 37: Fastening hole |
| 40: Header | 41: Protrusion |
| 42: Housing | 44: Hollow fiber membrane |
| 45: Inner passage | 46: Collector |
| 48: Treated water pipe | 49: Hose |
| 50: Supply pipe | 52: Injection pipe |
| 60: Raw water distributing part | 62: Blocking member |
| 64: Supporting member | 66: Outlet |
| 70: Inducing member | |

What is claimed is:

1. A hollow fiber membrane module, comprising:
a header coupled with a water container in which raw water is accommodated;
a hollow fiber membrane having one end coupled with an internal side of the header and the other end being a free end so as to filter raw water by water head;
a housing installed at the header, and extended into the water container, the hollow fiber membrane being disposed inside the housing;
a collector installed at the header and connected with the hollow fiber membrane to collect treated water;
a treated water pipe connected with the collector to discharge the treated water;
a supply pipe installed at the header to supply the raw water;
an injection pipe connected with the supply pipe and extended into the housing to discharge the raw water; and
a raw water distributing part installed at a front end of the injection pipe to make the raw water discharged through the injection pipe collide with the hollow fiber membrane to shake and wash the hollow fiber membrane.

2. The hollow fiber membrane module of claim 1, wherein the header further includes a fastening part for coupling with the water container, and
the fastening part has a structure in which a male thread is formed on an external peripheral surface of the fastening part or a female thread is formed on an internal peripheral surface of the fastening part, or a structure, in which a flange formed with a plurality of fastening holes protrudes.

3. The hollow fiber membrane module of claim 1, wherein the raw water distributing part includes:
a blocking member installed at the front end of the injection pipe to block flow of the raw water; and
a plurality of outlets formed on an external peripheral surface of the front end of the injection pipe toward the hollow fiber membrane to discharge the raw water to the hollow fiber membrane.

4. The hollow fiber membrane module of claim 3, wherein the injection pipe is installed at a center of the header and disposed at a center of the housing, and the hollow fiber membrane is disposed between the injection pipe and an internal peripheral surface of the housing based on the injection pipe.

5. The hollow fiber membrane module of claim 3, wherein the blocking member has a structure in which a hole discharging the raw water is formed at a center of the blocking member.

6. The hollow fiber membrane module of claim 3, wherein the blocking member is formed in a conic shape protruding to the outside.

7. The hollow fiber membrane module of claim 3, wherein the raw water distributing part further includes a conic-shaped inducing member, which is installed at an internal side of the blocking member and has a diameter that is gradually decreasing toward the injection pipe.

8. A water treatment device using a hollow fiber membrane module, comprising:
one or more water containers filled with raw water;
one or more hollow fiber membrane modules installed in the water container and provided with hollow fiber membranes therein to perform a water treatment by a water pressure difference; and
a raw water supplying part positioned on the water container, and configured to supply the raw water into the water container through the hollow fiber membrane module by using potential energy formed by a height difference,
wherein the hollow fiber membrane module causes the raw water supplied from the raw water supplying part to collide with the hollow fiber membrane to move the hollow fiber membrane,
wherein
the hollow fiber membrane module includes:
a header coupled with the water container;
a housing installed in the header and extended into the water container;

a hollow fiber membrane provided inside the housing and performing water treatment by a pressure difference;
a collector installed in the header and connected with the hollow fiber membrane to collect treated water;
a treated water pipe connected with the collector to discharge the treated water;
a supply pipe installed in the header to supply the raw water;
an injection pipe connected with the supply pipe and extended into the housing to discharge the raw water; and
a raw water distributing part installed at a front end of the injection pipe to make the raw water discharge through the injection pipe collide with the hollow fiber membrane.

9. The water treatment device of claim 8, wherein
the raw water supplying part includes:
one or more raw water containers positioned on the water container and configured to accommodate raw water to be supplied to the water container; and
a raw water pipe configured to connect a bottom of the raw water container with the hollow fiber membrane module to allow the raw water to move.

10. The water treatment device of claim 9, wherein
the raw water container is detachably/attachably installed at an upper end of the water container.

11. The water treatment device of claim 10, wherein
the raw water container configures a cover laid on an upper end of the water container, of which the upper end is opened, to cover the water container, a support extended in a downward direction is installed on a lateral surface of the raw water container, and a guide holder, which is installed at a position corresponding to the support formed position and has opened upper and lower ends, and through which the support passes, and a supporting holder, which is installed next to the guide holder and has an opened upper end and a closed lower end, and into which the support is fitted to be supported, are installed on an upper portion of a lateral surface of the water container, so that the support is selectively coupled with the guide holder or the supporting holder.

12. The water treatment device of claim 9, wherein
an isolation plate, which isolates an internal space of the water container into an upper space and a lower space, is installed at an internal side of the upper portion of the water container, so that the upper portion of the water container configures a raw water container, a movement passage formed by a partition wall, which is communicated with the raw water container and extended toward a bottom side of the water container inside the water container, configures a raw water pipe through which raw water moves, and the hollow fiber membrane module is mounted on the partition wall to receive the raw water through the movement passage.

13. The water treatment device of claim 12, wherein
in the water container, the plurality of hollow fiber membrane modules are arranged and installed on the partition wall at intervals, and a treated water pipe installed in each hollow fiber membrane module to discharge treated water is connected with a common discharge line to discharge treated water to the outside.

14. The water treatment device of claim 8, wherein
the raw water distributing part includes:
a blocking member installed at the front end of the injection pipe to block a flow of the raw water; and
a plurality of outlets formed on an external peripheral surface of the front end of the injection pipe toward the hollow fiber membrane to discharge the raw water to the hollow fiber membrane.

15. The water treatment device of claim 14, wherein
the injection pipe is installed at a center of the header and disposed at a center of the housing, and the hollow fiber membrane is disposed between the injection pipe and an internal peripheral surface of the housing based on the injection pipe.

16. The water treatment device of claim 14, wherein:
the header further includes a fastening part for coupling with the water container; and
the fastening part is installed at the header and has a structure in which a male thread or a female thread is formed on an external peripheral surface or an internal peripheral surface of the fastening part, and the fastening part formed with the female thread or the male thread on the internal peripheral surface or the external peripheral surface is formed in the water container so that the fastening part is screw-engaged with a fastener to be detachably/attachably coupled with the fastener.

17. The water treatment device of claim 14, wherein:
the header further includes a fastening part for coupling with the water container; and
the fastening part is formed with a flange protruding to the outside of the header, and a plurality of fastening holes are formed in the flange at intervals to be bolt-coupled with the water container.

18. The water treatment device of claim 16, wherein
the fastening part further includes a sealing member for maintaining air-tightness with the water container.

* * * * *